(12) United States Patent
Egi

(10) Patent No.: US 6,778,929 B2
(45) Date of Patent: Aug. 17, 2004

US006778929B2

(54) METHOD AND SYSTEM FOR ESTIMATING METEOROLOGICAL QUANTITIES

(75) Inventor: Masashi Egi, Kokubunji (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 10/441,094

(22) Filed: May 20, 2003

(65) Prior Publication Data

US 2004/0064255 A1 Apr. 1, 2004

(30) Foreign Application Priority Data

Sep. 27, 2002 (JP) ........................................ 2002-282167

(51) Int. Cl.$^7$ .............................................. G01D 18/00
(52) U.S. Cl. .......................................... 702/104; 705/35
(58) Field of Search ................................. 702/3, 104, 2, 702/4; 705/35; 342/26, 460; 701/1; 706/931; 703/2

(56) References Cited

U.S. PATENT DOCUMENTS

| | | | |
|---|---|---|---|
| 5,469,168 A | * 11/1995 | Anderson | 342/26 |
| 5,654,907 A | * 8/1997 | Lange | 702/104 |
| 6,202,033 B1 | * 3/2001 | Lange | 702/104 |
| 6,418,417 B1 | 7/2002 | Corby et al. | 705/35 |
| 6,535,817 B1 | * 3/2003 | Krishnamuri | 702/3 |
| 6,549,828 B1 | * 4/2003 | Garrot et al. | 701/1 |
| 6,563,452 B1 | * 5/2003 | Zheng et al. | 342/26 |
| 2003/0025627 A1 | * 2/2003 | Wilson et al. | 702/3 |

OTHER PUBLICATIONS

William M. Briggs and Daniel S. Wilks, "Modifying Parameters of a Daily Stochastic Weather Generator Using Long–Range Forecasts", 13$^{th}$ Conf on Prob & Stats, pp. 243–246.

D.S. Wilks, "Space–Time Downscaling of Probabilistic Seasonal Forecasts with a 'Weather Generator'", (11 pages).

D.S. Wilks, "Realizations of Daily Weather in Forecast Seasonal Climate", 2002 American Meteorological Society, (Apr. 2002), pp. 195–206.

* cited by examiner

Primary Examiner—John Barlow
Assistant Examiner—Victor J. Taylor
(74) Attorney, Agent, or Firm—Reed Smith LLP; Stanley P. Fisher, Esq.; Juan Carlos A. Marquez, Esq.

(57) ABSTRACT

Estimation method for obtaining estimation results of meteorological quantities in a specified area during a specified future period, including steps of: provisionally creating a meteorological time-series model from historical data of the meteorological quantities observed in the specified area; adjusting parameters of the created time-series model on the basis of long-range weather forecast data for wider area, which contains future meteorological tendency relative to normal years, to adjust the created time-series model; and conducting simulation using the adjusted time-series model to obtain the estimation results.

18 Claims, 17 Drawing Sheets

| DATE | SENDAI | TOKYO | OSAKA | FUKUOKA |
|---|---|---|---|---|
| 1971/01/01 | 3.5 | 7.5 | 6.7 | 1.8 |
| ... | ... | ... | ... | ... |
| 1971/12/31 | 7.7 | 2.9 | 7.7 | 8.5 |
| 1972/01/01 | 5.1 | 4.1 | 1.2 | 1.5 |
| ... | ... | ... | ... | ... |
| 2000/12/31 | 4.1 | 0 | 2.2 | 2.2 |
| 2001/01/01 | 2.8 | 8.5 | 3.6 | 5.3 |
| ... | ... | ... | ... | ... |
| 2001/12/31 | 1.6 | 8.9 | 8.8 | 7.3 |

| FORECAST PERIOD | JUNE/01~AUGUST/31 | 041 |
|---|---|---|
| NORMAL RANGE OF PERIOD AVERAGED TEMPERATURE | 24.3°C~25.0°C | 042 |
| BELOW-NORMAL | 20% | 043 |
| NEAR-NORMAL | 30% | |
| ABOVE-NORMAL | 50% | |

| ESTIMATION PERIOD | JUNE/01~AUGUST/31 | 051 |
|---|---|---|
| ESTIMATION POINT | TOKYO | 052 |
| NUMBER OF TIMES OF SIMULATION | 10000 TIMES | 053 |

FIG. 9

| DATE | #1 | #2 | ... | #10000 |
|------|------|------|-----|--------|
| 06/01 | 19.7 | 16.7 | 23.7 | 20.1 |
| ... | ... | ... | ... | ... |
| 06/30 | 25.1 | 20.2 | 21.7 | 21.5 |
| 07/01 | 25.3 | 20.8 | 22.4 | 19.5 |
| ... | ... | ... | ... | ... |
| 07/31 | 27.9 | 28.1 | 26.8 | 25.2 |
| 08/01 | 27.6 | 25.6 | 27.4 | 26.2 |
| ... | ... | ... | ... | ... |
| 08/31 | 23.6 | 26.7 | 24.1 | 22.8 |

FIG. 10

| DATE | TOKYO |
|------|-------|
| 1971/01/01 | 7.5 |
| ... | ... |
| 1971/12/31 | 2.9 |
| 1972/01/01 | 4.1 |
| ... | ... |
| 2000/12/31 | 0 |
| 2001/01/01 | 8.5 |
| ... | ... |
| 2001/12/31 | 8.9 |

FIG. 20

INPUT THE LONG-RANGE FORECAST DATA

FORECAST PERIOD  JUNE ▶ / 01 ▶ ~ AUGUST ▶ / 31 ▶

BELOW-NORMAL  20 ▶ %
NEAR-NORMAL  50 ▶ %
ABOVE-NORMAL  30 ▶ %

INPUT THE ESTIMINATION CONDITIONS

ESTIMINATION PERIOD  JUNE ▶ / 01 ▶ ~ AUGUST ▶ / 31 ▶
ESTIMINATION POINT  TOKYO ▶
NUMBER OF TIMES OF SIMULATION  10000 ▶

211
212
213

METHOD AND SYSTEM FOR ESTIMATING METEOROLOGICAL QUANTITIES

PRIORITY INFORMATION

The present invention claims priority to Japanese Patent Application No. 2002-282167, filed Sep. 27, 2002, which is herein incorporated by reference.

BACKGROUND OF THE INVENTION

1. Field of the Invention

The present invention generally relates to estimating meteorological quantities and, more particularly, to estimating meteorological quantities based on a meteorological time-series model.

2. Discussion of Background

As a derivative product for hedging reduction of sales amount and increase of cost resulting from variations of temperature, amount of rainfall and amount of snow coverage or the like, a weather derivative (transaction) is known. The weather derivative transaction is agreed between customers (enterprises, organizations, corporate organizations and associations, etc.) whose amount of sales is largely affected by weather conditions and, for example, product-liability insurance companies (banks, etc.). In the case of hedging the risk for reduction of sales amount because of a lower temperature in comparison with normal years, a customer and a product-liability insurance company agreed, for example, in the contract of following contents for the purpose of weather derivative transactions (1) Observation period: from June 1st to August 31st
(2) Weather index: Average temperature (the number of days in which the average temperature of a day is less than 25° C.)
(3) Observation point: Tokyo
(4) Strike value: Four days (Compensatory payment may be received from a $5^{th}$ day in the case where there are four or more days when the average temperature of a day is less than 25° C.)
(5) Compensatory payment: $10 per day (upper limit: $200)
(6) Premium: $50

When the weather derivative transaction of the contract content described above is executed, the amount of compensatory payment is different depending on estimation of weather index within the observation period. Therefore, estimation of weather index is very important for both the customer and the product-liability insurance company.

For estimation of meteorological quantities such as temperature and amount of rainfall, etc. as the weather index, a method has been introduced in which a meteorological time-series model has been formed first from historical data of meteorological quantities in the past at the observation point. Then fluctuation of meteorological quantities within the observation period has been estimated with the Monte-Carlo simulation based on this model.

As an example, we will explain the Dischel model which is famous as a weather time-series model for temperature of each day. The Dischel model is expressed by the Formula 1:

$$T_n = (1 - \beta)\Theta_n + \beta T_{n-1} + \varepsilon_n \quad \text{[Expression 1]}$$

$$\varepsilon_n \sim \text{Normal}[\mu, \sigma^2]$$

Here, n represents the n-th day (for example, Feb. 1, 2000 when n=32) in the case where the desired day (for example, Jan. 1, 2000) is defined as the first day, $\Theta n$ represents the average temperature of the date corresponding to the n-th day (average temperature of several years in the past of the February 1 when n=32, for example), $T_n$ represents the temperature of the n-th day. Here, the parameters $\beta, \mu, \sigma$ are constants. Moreover, $\varepsilon_n$ is a stochastic variable which follows the normal distribution of average $\mu$ and variation $\sigma^2$. In addition, $\beta$ indicates a rate of dependence of temperature $T_n$ of the n-th day respectively on the average temperature $\Theta_n$ of several years in the past of the object day and the temperature $T_{n-1}$ of the yesterday of the object day n. Values of three parameters are generally estimated using the least-squares method from the historical data of temperature of several years in the past at the observation point.

When the parameters are once determined, temperature time-series sequence $T_1, T_2, T_3, \ldots$ can be sequentially estimated by giving the initial value $T_0$ and random number sequences $\varepsilon_1, \varepsilon_2, \varepsilon_3 \ldots$. When the estimation period is ranged from n=1 to n=N, a set of estimated temperature time-series sequences is formed of $T_1, \ldots, T_N$. Such estimated temperature time-series sequences are estimated from several thousands to several tens of thousands examples by changing the random number sequences.

An amount of compensatory payment to be paid to a customer from the product-liability insurance company is calculated in each estimated time-series sequence in order to calculate probability density distribution. The product-liability insurance company finally calculates a premium based on this probability density distribution. The premium calculation process has been summarized above.

Moreover, estimation of meteorological quantities such as temperature and amount of rainfall has very important significance for company strategy, completion of various events and activities. In addition, everyone is interested in the matters represented by meteorological quantities such as temperature and amount of rainfall.

SUMMARY OF THE INVENTION

A meteorological model used in the economic activities represented by weather derivative transaction is a simplified time-series model where attention is paid only to meteorological fluctuation at a spatial point, namely at the observation point. When parameters of the model are estimated only from the historical data of meteorological quantities, future forecast using a model only indicates an average tendency at the observation point. In other words, practical tendency of each year that it is likely to be cool this summer cannot be estimated.

Such detail estimation of meteorological phenomenon is always requested to introduce a large amount of processes and advanced skill to evaluate various data such as execution of simulation in the global scale based on the extremely detail meteorological mechanical model which has been done by the Meteorological Agency.

Actually, the Meteorological Agency announces long-range weather forecast data of the next one months and three months for temperature and amount of rainfall based on the references such as result of large scale simulation. The long-range forecasts are issued in three grades that the average temperature in the forecast period (amount of rainfall in the forecast period) is "below-normal", "near-normal" and "above-normal". The range of each grade is defined to provide equal appearance ratio (33%, respectively) during past 30 years. For example, in the one-month forecast (weather forecast for the period up to September 16 from August 17) of "Kanto and Koshinetsu Regions", an average temperature of the coming month is that "probability for below-normal is 20%, probability for near-normal is 50% and probability for above-normal is 30%". Accuracy of the long-range weather forecast is improved from year to year and this improvement is expected more and more in future with improvement in capability of computer system.

However, such long-range weather forecast provides only macroscopic information such as probability distribution of average temperature and amount of rainfall during the forecast period. Meanwhile, microscopic information such as probability distribution of temperature and amount of rainfall of each day is often requested for the economic activities represented by weather derivative transaction. In actuality, a meteorological time-series model such as Dischel model has a demerit that tendency of each year cannot be forecasted while it has a merit that microscopic information such as probability distribution of temperature and amount of rainfall of each day can be treated. Therefore, such a meteorological time-series model is considered to have been widely spread in the weather derivative transaction because of the merit described above.

It is important to note that an ideal meteorological times-series model having the merits of both macroscopic and microscopic information can be formed by reflecting the long-range weather forecast providing macroscopic information on the weather time-series model providing microscopic information.

Accordingly, an object of the present invention is to provide a method, a system, a program, and a computer-readable medium for estimating meteorological quantities of each day reflecting the long-range weather forecast announced by the Meteorological Agency in order to accurately evaluate adverse effect of the meteorological quantities such as daily temperature and amount of rainfall on the economic activities.

In view of solving the problems described above, in one example, a method is provided for estimating meteorological quantities. The method comprises acquiring estimation conditions for meteorological quantities including historical data of meteorological quantities such as temperature and amount of rainfall observed in the past; acquiring an estimation period for estimating meteorological quantities at an estimation point; acquiring a number of times for a simulation; acquiring long-range weather forecast data provided by the Meteorological Agency for the meteorological quantities during the estimation period at the estimation point; creating a meteorological time-series model for the meteorological quantities during the estimation period at the estimation point based on acquired historical data of meteorological quantities and acquired long-range weather forecast data; conducting for the number of times the simulation using the meteorological time-series model; and outputting a meteorological quantities estimation result based on the simulation using the meteorological time-series model.

The invention encompasses other embodiments of a method, a system, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

FIG. 3 is a table illustrating an example of historical data of meteorological quantities of FIG. 2;

FIG. 4 is a table illustrating an example of long-range weather forecast of FIG. 2;

FIG. 5 is a table illustrating an example of estimation condition of FIG. 2;

FIG. 9 is a table illustrating an example of a meteorological quantities estimation result of FIG. 2;

FIG. 10 is a table illustrating an example of historical data of meteorological quantities obtained from FIG. 3 based on the estimation condition of FIG. 5;

FIG. 20 is a diagram illustrating an example of a long-range weather forecast input display image in the meteorological quantities estimation system of FIG. 11 and FIG. 16; and FIG. 21 is a diagram illustrating an example of an estimation condition input display image in the meteorological quantities estimation system of FIG. 11 and FIG. 16.

DESCRIPTION OF THE PREFERRED EMBODIMENTS

Figure 1:
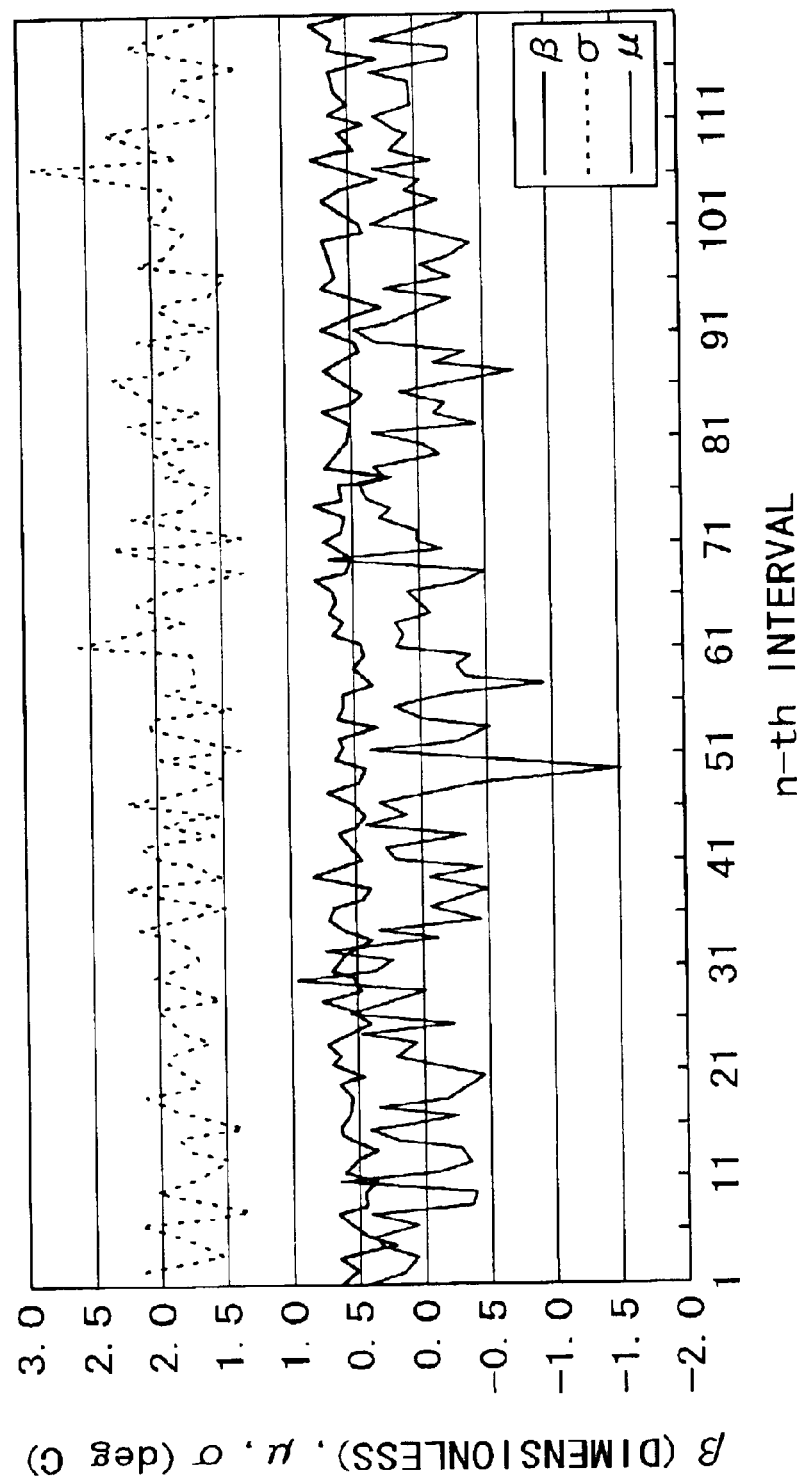
FIG. 1 is a graph illustrating transition of estimated parameter values during three months (in every season)

An invention for a system, a method, a program, and a computer-readable medium for estimating meteorological quantities is disclosed. Numerous specific details are set forth in order to provide a thorough understanding of the present invention. It will be understood, however, to one skilled in the art, that the present invention may be practiced without some or without all of these specific details.

Theoretical aspects of the Dischel model described above will be described. Practical aspects of the present invention will then be described on the basis of these theoretical aspects.

Theoretical Aspects

First, it will be described that distribution of average temperature during the specified period by the Dischel model will become a normal distribution and then a method to convert probability distribution of long-range weather forecast to the normal distribution will be described. Moreover, a method for adjusting the normal distribution of the former to the parameters for matching with the normal distribution of the latter and then its physical principle will be described.

First, it is described that distribution of average temperature in the specified period of temperature time-series sequence created by the Dischel model becomes the normal distribution. Temperature $T_n$ of the n-th day of the [Expression 1] can be expressed as follows using the initial value $T_0$ and temperature sequence of ordinary years $\Theta_1$, $\Theta_2$, . . .

$$T_n = (1-\beta)\sum_{i=1}^{n} \beta^{n-i}\Theta_i + \beta^n T_0 + \sum_{i=1}^{n} \beta^{n-1}\varepsilon_i \quad \text{[Expression 2]}$$

The first and second terms do not depend on probable variation and only the third term depends on probable variation. Moreover, as a physical amount corresponding to average temperature in the specified period of long-range weather forecast, the average temperature T in the specified period during the N days up to N-th day from the first day is defined as follows:

$$\tau = \frac{T_1 + \ldots + T_N}{N} \quad \text{[Expression 3]}$$

T can be expressed as follows.

$$\tau = \frac{1}{N}\sum_{i=1}^{N}(1-\beta^{N+1-i})\Theta_i + \frac{\beta(1-\beta^N)T_0}{N(1-\beta)} + \sum_{i=1}^{N}\frac{1-\beta^{N+1-i}}{N(1-\beta)}\varepsilon_i \quad \text{[Expression 4]}$$

Here, the first and second terms do not depend on probable variation and only the third term depends on probable variation. Since $\varepsilon_i$ conforms to the normal distribution of average $\mu$ and variation $\sigma^2$, it can be understood that the value of T conforms to the normal distribution of the average $E[T]$ and variation $V[T]$. However, $E[T]$ and $V[T]$ can be given by the following formula:

$$E[\tau] = \frac{1}{N}\sum_{i=1}^{N}(1-\beta^{N-1-i})\Theta_i + \frac{\beta(1-\beta^N)T_0}{N(1-\beta)} + \frac{\mu}{1-\beta}\left\{1 - \frac{\beta(1-\beta^N)}{N(1-\beta)}\right\}$$

$$V[\tau] = \frac{\sigma^2}{N^2(1-\beta)^2}\left\{N - \frac{2\beta(1-\beta^N)}{1-\beta} + \frac{B^2(1-\beta^{2N})}{1-\beta^2}\right\} \quad \text{[Expression 5]}$$

As described above, it has been proved that distribution of the average temperature during the specified period in the temperature time-series sequence created by the Dischel model becomes the normal distribution.

Meanwhile, the long-range weather forecast gives the forecast data to which T follows the probability distribution of "below-normal", "near-normal" and "above-normal" and is not suitable for comparison with the normal distribution characterized by the [Expression 5].

Therefore, a method of converting a probability distribution of long-range weather forecast to the normal distribution will be described. Here, the probabilities for "below-normal" and "above-normal" are denoted by is referred to as $p_1$ and $p_2$, respectively. Here, $x_1$ and $x_2$ are defined as follows, considering the stochastic variable x following the standard normal distribution of average 0, variation 1:

$$P_1 = \int_{-\infty}^{x_1} \frac{\exp(-x^2/2)}{\sqrt{2\pi}} dx \quad \text{[Expression 6]}$$

$$P_2 = \int_{x_2}^{\infty} \frac{\exp(-x^2/2)}{\sqrt{2\pi}} dx$$

It is rather easy to numerically solve equations of [Expression 6] respectively for $x_1$ and $x_2$ for the given $p_1$ and $p_2$. In actuality, a solving method is never referred here because many numerical calculation software applications are provided with such a function. The range of the grade given by the long-range weather forecast is expressed as [$T_1$, $T_2$]. This range is actually announced, for example, in the form that "average temperature of the coming month is 25.8° C. and difference in normal years is −0.3° C. to +0.4° C.". Namely, in this case, the range of the grade "near-normal" is defined as [25.5° C., 26.2° C.]. Here, we consider the following stochastic variable y.

$$y = C_2 x + C_1 \quad \text{[Expression 7]}$$

where, $C_1$, $C_2$ are constants to be determined thereafter. Apparently, y follows the normal distribution of average $C_1$ variation $C_2^2$. Here, we define $y_1$ and $y_2$ as $y_1 = C_2 x_1 + C_1$ and $y_2 = C_2 x_2 + C_1$, respectively. If we determine $C_1$, $C_2$ satisfying $y_1 = T_1$ and $y_2 = T_2$, y follows the normal distribution where the probability distribution of each grade becomes equal to that of the long-range weather forecast as described below:

$$P[y < \tau_1] = P_1$$

$$P[\tau_1 \leq y < \tau_2] = 1 - P_1 - P_2$$

$$P[\tau_2 \leq y] = P_2 \quad \text{[Expression 8]}$$

Then, solving $y_1 = C_2 x_1 + C_1$, $y_2 = C_2 x_2 + C_1$ for $C_1$ and $C_2$, we obtain:

$$C_1 = \frac{\tau_1 x_2 - \tau_2 x_1}{x_2 - x_1} \quad \text{[Expression 9]}$$

$$C_2 = \frac{\tau_2 - \tau_1}{x_2 - x_1}$$

As described above, the long-range weather forecast can be converted to the normal distribution where the probability distribution of each grade becomes equal to that of the long-range weather forecast. Hereinafter, this converted distribution is referred to as the normal distribution of long-range weather forecast.

Two normal distributions can be identified if their averages and variations are equal, respectively. Average and variation of the normal distribution in the Dischel model are expressed as E[T] and V[T] which are given by the [Expression 5]. Moreover, average and variation of the normal distribution in the long-range weather forecast are expressed as $C_1$, $C_2^2$ which are given by the [Expression 9]. These values are naturally not matched with each other.

However, it can be thought that the long-range weather forecast estimates more accurately the meteorological phenomena in future with the amount of information used and accuracy of meteorological model taken into consideration.

Therefore, we should determine parameters for matching the normal distribution of the Dischel model to that of the long-range weather forecast.

It is the best when all parameters can be determined only from the long-range weather forecast, but in this case the amount of information is insufficient in the case of Dischel model. The simultaneous equations of [Expression 10] and [Expression 11] wherein average and variation are respectively equal can be attained from the [Expression 5] and [Expression 11]:

$$\frac{1}{N}\sum_{i=1}^{N}(1-\beta^{N+1-i})\Theta_i + \frac{\beta(1-\beta^N)T_0}{N(1-\beta)} + \frac{\mu}{1-\beta}\left\{1-\frac{\beta(1-\beta^N)}{N(1-\beta)}\right\} = \frac{\tau_1 x_2 - \tau_2 x_1}{x_2 - x_1}$$ [Expression 10]

$$\frac{\sigma^2}{N^2(1-\beta)^2}\left\{N - \frac{2\beta(1-\beta^N)}{1-\beta} + \frac{\beta^2(1-\beta^{2N})}{1-\beta^2}\right\} = \left(\frac{\tau_2-\tau_1}{x_2-x_1}\right)^2$$ [Expression 11]

Since there are three parameters ($\beta$, $\mu$, $\sigma$) for two equations, a unique solution cannot apparently be obtained. Namely, new information is necessary.

Therefore, useful information can be extracted from the historical data of temperature in the past. As an example, attention is paid to the average temperature data of each day up to Dec. 31, 2000 from Jan. 1, 1971 at the observation point, Tokyo. A result of process that this data is distributed for the sections of three months (every season) and parameters are estimated for each section is illustrated in FIG. 1. It can be understood that each parameter is fluctuated to a large extent in every section. In this case, standard deviation from average value of each parameter can be summarized as illustrated in Table 1.

TABLE 1

| Parameter | Average | Standard Deviation |
|---|---|---|
| $\beta$ | 0.56 | 0.12 |
| $\mu$ | −0.01 | 0.36 |
| $\sigma$ | 1.83 | 0.26 |

A major cause of such fluctuation is occurrence of meteorological phenomena which are deviated from that of ordinary years such as "This summer is intensively hot" or "This winter is rather warm". On the contrary, when the parameters are fluctuated as much as the standard deviation of Table 1 (written as $\Delta\beta$, $\mu\Delta$, $\Delta\sigma$), how much do the E[T] and V[T] given by the [Expression 5] change? As a result of practical evaluation, the solution expressed by the [Expression 12] can be obtained:

$|E(\beta+\Delta\beta,\mu,\sigma)-E(\beta,\mu,\sigma)|=0.25$ $|E(\beta,\mu+\Delta\mu,\sigma)-E(\beta,\mu,\sigma)|=0.96$ $|E(\beta,\mu,\sigma+\Delta\sigma)-E(\beta,\mu,\sigma)|=0$ $|V^{1/2}(\beta+\Delta\beta,\mu,\sigma)-V^{1/2}(\beta,\mu,\sigma)|=0.28$ $|V^{1/2}(\beta,\mu+\Delta\mu,\sigma)-V^{1/2}(\beta,\mu,\sigma)|=0$ $|V^{1/2}(\beta,\mu,\sigma+\Delta\sigma)-V^{1/2}(\beta,\mu,\sigma)|=0.07$ [Expression 12]

However, E[T] and V[T] are values calculated for average temperature during the period up to Aug. 31, 2001 from Jun. 1, 2002. Moreover, each parameter can be estimated from the data during the period up to Dec. 31, 2000 from Jan. 1, 1971, while $T_0$ is average temperature of a day of May 3, 2001. This result can be evaluated as follows. Here, it is assumed that average value of T (namely E) is changed by 1° C. If it is also assumed that change of E is caused by fluctuation of $\beta$, fluctuation range of $\beta$ equal to about four times the $\Delta\beta$ is required but probability of occurrence of the fluctuation as large as about four times the standard deviation is smaller than $1/10^4$. Meanwhile, when it is assumed that variation of E is caused by fluctuation of $\mu$, fluctuation range of $\mu$ is enough when it is equal to about $\Delta\mu$ and probability of such fluctuation is about 30%. Accordingly, the fluctuation of $\mu$ assures the highest reliability for description of variation of E. As described above, the variation of E mostly results in the variation of $\mu$. In the same way, the variation of V mostly results in the variation of $\beta$. In other words, fluctuation of $\sigma$ can approximately ignored and a value estimated from the historical data of temperature in the past may be utilized.

First, values of $\beta$, $\mu$, $\sigma$ are determined with the least squares method from the historical data of temperature in the past by paying attention to this physical property. Next, a value of $\beta$ is numerically solved again to satisfy the [Expression 11] based on the long-range weather forecast, and a value of $\mu$ can be solved again by substituting the value of $\beta$ after the adjustment to the [Expression 10]. Thereby, a set of parameters after the adjustment can be obtained.

As described above, it is now possible to effectively acquire the physical information of the spatially wider area that probability of this summer to become cold summer is high by reflecting the long-range weather forecast on the parameters of the meteorological time-series model. However, the description developed here is never limited only to the Dischel model and a similar description can also be applied to the other proposed meteorological time-series models.

Practical Aspects

Figure 2:
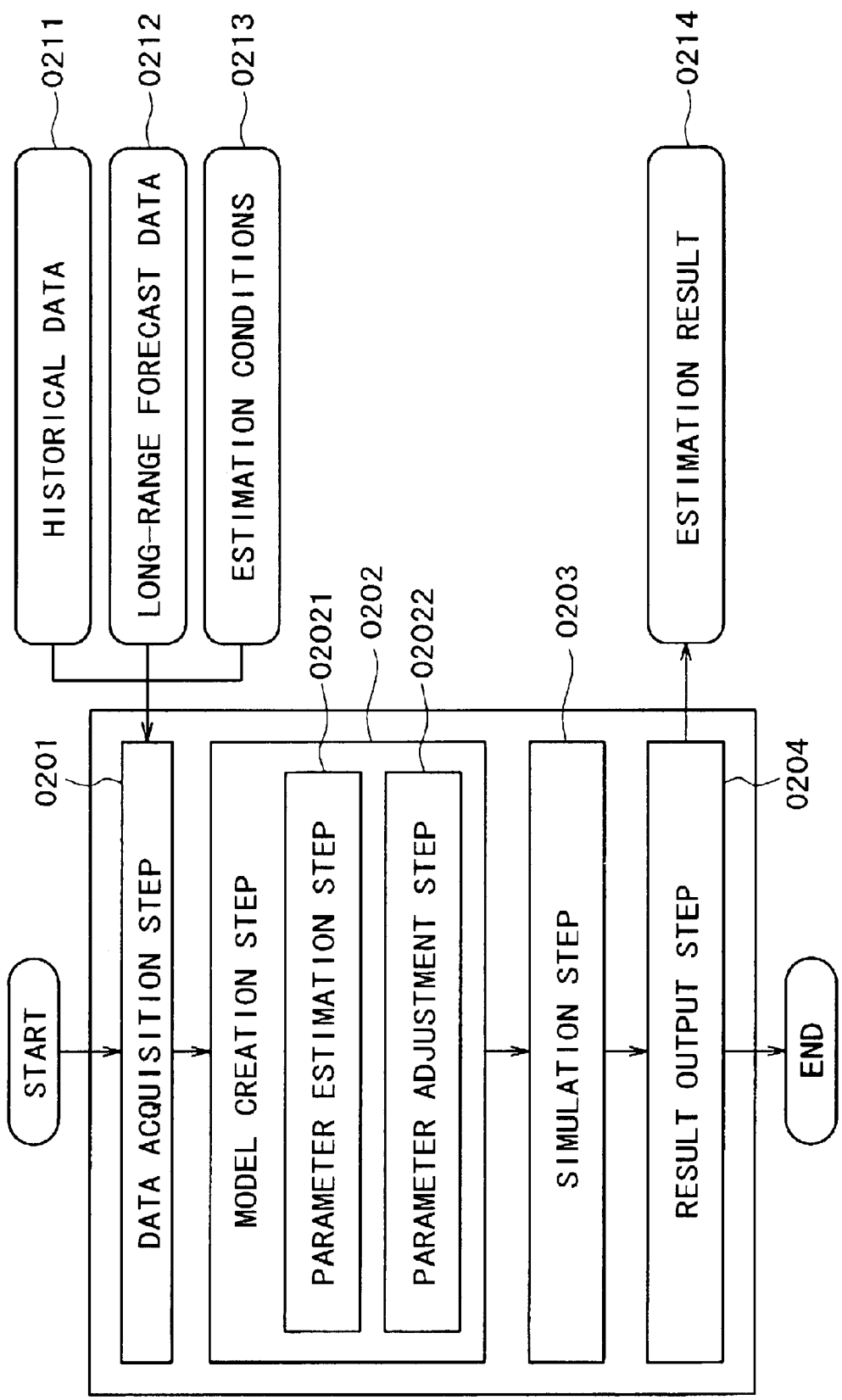
FIG. 2 is a flowchart illustrating an estimation method of meteorological quantities in an embodiment of the present invention.

FIG. 2 is a flowchart illustrating an embodiment of the meteorological quantities estimation method of the present invention.

As illustrated in FIG. 2, the estimation method of meteorological quantities of this embodiment comprises a data acquisition step 0201 for acquiring historical data of meteorological quantities 0211 as the historical data of meteorological quantities observed in the past, long-range weather forecast data announced from the Meteorological Agency 0212 and estimation condition 0213 as the condition for estimating meteorological quantities, a meteorological time-series model creation step 0202 for creating a time-series model of meteorological quantities by utilizing the information acquired in the data acquisition step 0201, a meteorological quantities simulation step 0203 for simulating meteorological quantities by utilizing the meteorological time-series model created in the meteorological time-series model creation step 0202 and a meteorological quantities estimation result output step 0204 for outputting the simulation result of the meteorological quantities simulation step 0203 as the meteorological quantities estimation result 0214.

Moreover, the meteorological quantities time-series model creation step 0202 comprises a meteorological time-series model parameter estimation step 02021 for estimating parameter values of the meteorological time-series model from the historical data of meteorological quantities 0211 and a meteorological time-series model parameter adjustment step 02022 for adjusting the parameters estimated in the meteorological time-series model parameter estimation step based on long-range weather forecast data 0212.

Next, an example of the historical data of meteorological quantities of FIG. 2 will be explained with reference to FIG. 3.

The historical data of meteorological quantities 0211 of this embodiment includes date 031 and average temperature 032 of a day of each day at each observation point. In FIG. 3, for example, the average temperature of a day of Tokyo of Jan. 1, 1972 is 4.1[° C.].

Next, an example of the long-range weather forecast data 0212 in FIG. 2 will be described with reference to FIG. 4.

The long-range weather forecast data 0212 of this embodiment is composed of the forecast period 041, range of ordinary years 042 and probability distribution 043 of three grades including "below-normal", "near-normal" and "above-normal". FIG. 4 illustrates contents of announcement of long-range weather forecast announced from the Meteorological Agency.

Next, an example of the estimation condition 0213 of FIG. 2 will be described with reference to FIG. 5.

The estimation condition 0213 of this embodiment includes an estimation period 051 of average temperature of a day, an estimation point 052 and the number of times of simulation 053. FIG. 5 suggests that 10000 average time-series sequences of a day during the period up to August 31 from June 1 in Tokyo are generated with the simulation.

Next, the data acquisition step 0201 of FIG. 2 will be described with reference to FIG. 3, FIG. 5 and FIG. 10.

Since the estimation point 052 is selected to Tokyo in the estimation condition 0213 of FIG. 5, the historical data of meteorological quantities acquired from the historical data of meteorological quantities of FIG. 3 becomes the meteorological quantities in the past of Tokyo as illustrated in FIG. 10. However, in this embodiment, it is assumed that the forecast period 041 of FIG. 4 and the estimation period 051 of FIG. 5 are in the relationship that the forecast period 041 is matched with the estimation period 051 or the forecast period 041 includes the estimation period 051.

Next, an example of the meteorological time-series model parameter estimation step 02021 of this embodiment will be described with reference to FIG. 6. This meteorological time-series model parameter estimation step 02021 is prepared to estimate the meteorological time-series model parameters from the meteorological data in the past.

In the meteorological time-series model parameter estimation step 20021 of this embodiment, the parameters $\beta$, $\mu$, $\sigma$ of the Dischel model given by the [Expression 1] are estimated.

Figure 6:
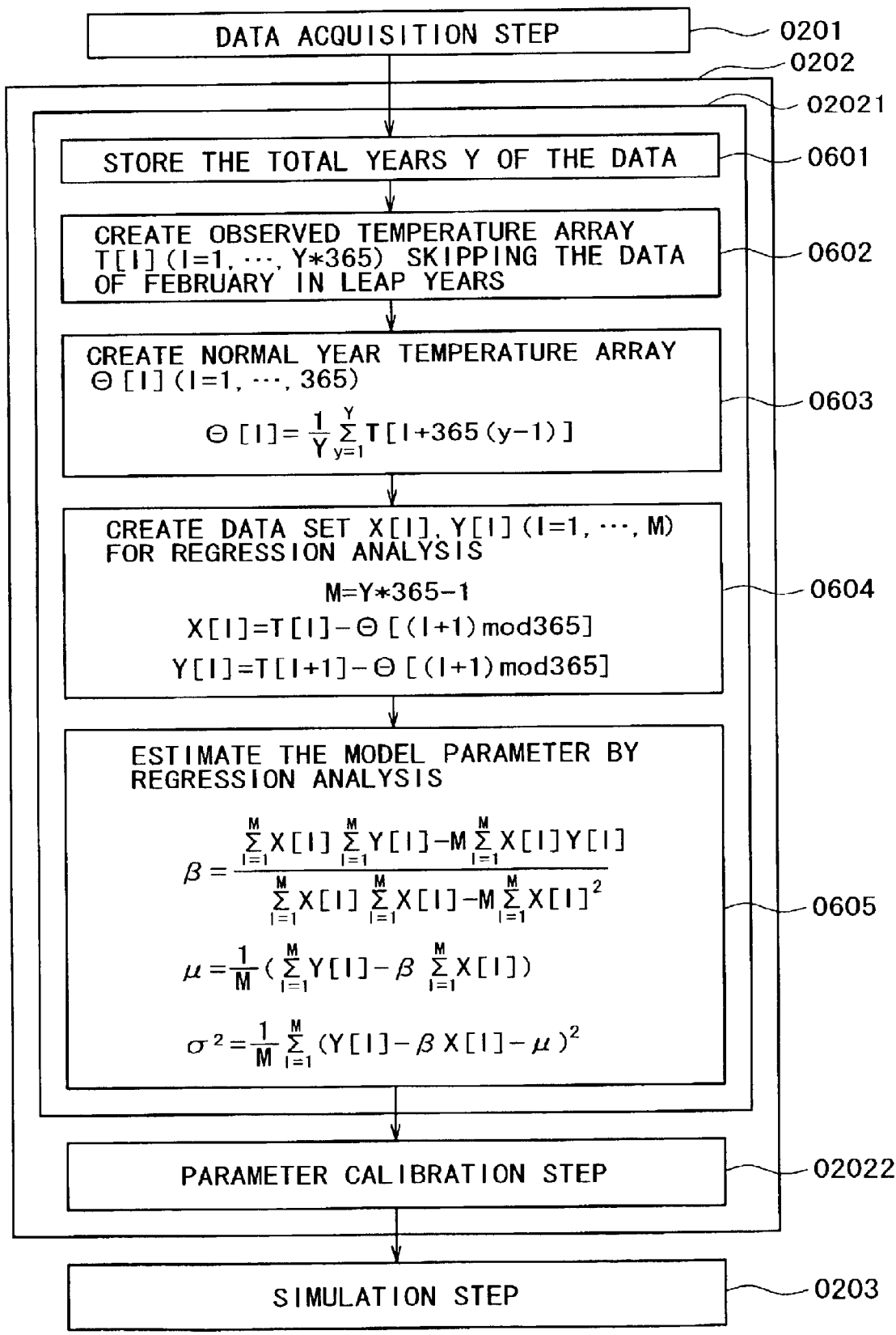
FIG. 6 is a flowchart illustrating an example of a parameter estimation step of a meteorological time-series model of FIG. 2.

As illustrated in FIG. 6, the meteorological time-series model parameter estimation step 02021 of FIG. 2 comprises an initialization step 0601, an observed temperature array creation step 0602, a normal year temperature array creation step 0603, an observation point array creation step 0604 and a regression analysis step 0605.

In the initialization step 0601, the total years Y of historical data is stored by referring to the historical data of average temperature 0211 (FIG. 10). For example, since FIG. 10 includes the data of 31 years, the data Y=31 is stored. In the observed temperature array creation step 0602, the observed temperature array T[l] (l=1, . . . , 365*Y) is created by referring to the historical data 0211 (FIG. 10) of the average temperature under the condition that the day February 29 is skipped in the case of leap year. In the ordinary year temperature array creation step, the average temperature of the day in the same date during Y years, namely the ordinary year temperature array $\Theta[l]$(l=1, . . . , 365) is created based on the [Expression 13] from the observed temperature array:

$$\Theta[l] = \frac{1}{Y}\sum_{y=1}^{Y} T[l + 365(y-1)]$$ [Expression 13]

Here, the regression formula such as [Expression 14] is prepared for the [Expression 1]:

$$y = \beta x + \mu$$ [Expression 14]

However, $\delta$ is a residual in average 0. For this regression formula, observation points in the number of M=365*Y−1 are prepared based on the [Expression 15] introducing a regressand x and a regressor y:

$$y_n = T_{n+1} - \Theta_{n+1}$$

$$x_n = T_n - \Theta_{n+1}$$

$$(n=1, \ldots, M)$$ [Expression 15]

Here, the regression analysis is executed for these observation points to obtain $\beta$, $\mu$ and $\sigma^2$ which is a variation of residual $\delta$. Therefore, in the observation point array creation step, the regressor array Y[l](l=1, . . . , M) and the regressand array X[l](l=1, . . . , M) are created based on the [Expression 16] from the observed temperature array T[l] and ordinary year temperature array $\Theta[l]$:

$$Y[l] = T[l+1] - \Theta[l+1]$$

$$X[l] = T[l] - \Theta[l+1]$$ [Expression 16]

In the regression analysis step, the values of $\beta$, $\mu$, $\sigma^2$ are estimated based on the [Expression 17] derived with the least-squares method based on the X[l] and Y[l] created in the observation point array creation step.

$$\beta = \frac{\sum_{l=1}^{M} X[l] \sum_{i=1}^{M} Y[l] - M \sum_{i=1}^{M} X[l]Y[l]}{\sum_{l=1}^{M} X[l] \sum_{i=1}^{M} X[l] - M \sum_{i=1}^{M} X[l]^2}$$ [Expression 17]

$$\mu = \frac{1}{M}\left(\sum_{i=1}^{M} Y[l] - \beta \sum_{i=1}^{M} X[l]\right)$$

$$\sigma^2 = \frac{1}{M}\sum_{l=1}^{l}(Y[l] - \beta X[l] - \mu)^2$$

Next, an example of the meteorological time-series model parameter adjustment step 02022 of this embodiment will be described with reference to FIG. 7. In this meteorological time-series model parameter adjustment step 02021, the adjustment process is executed to fetch the long-range weather forecast data to the parameters determined from the meteorological data in the past.

Figure 7:
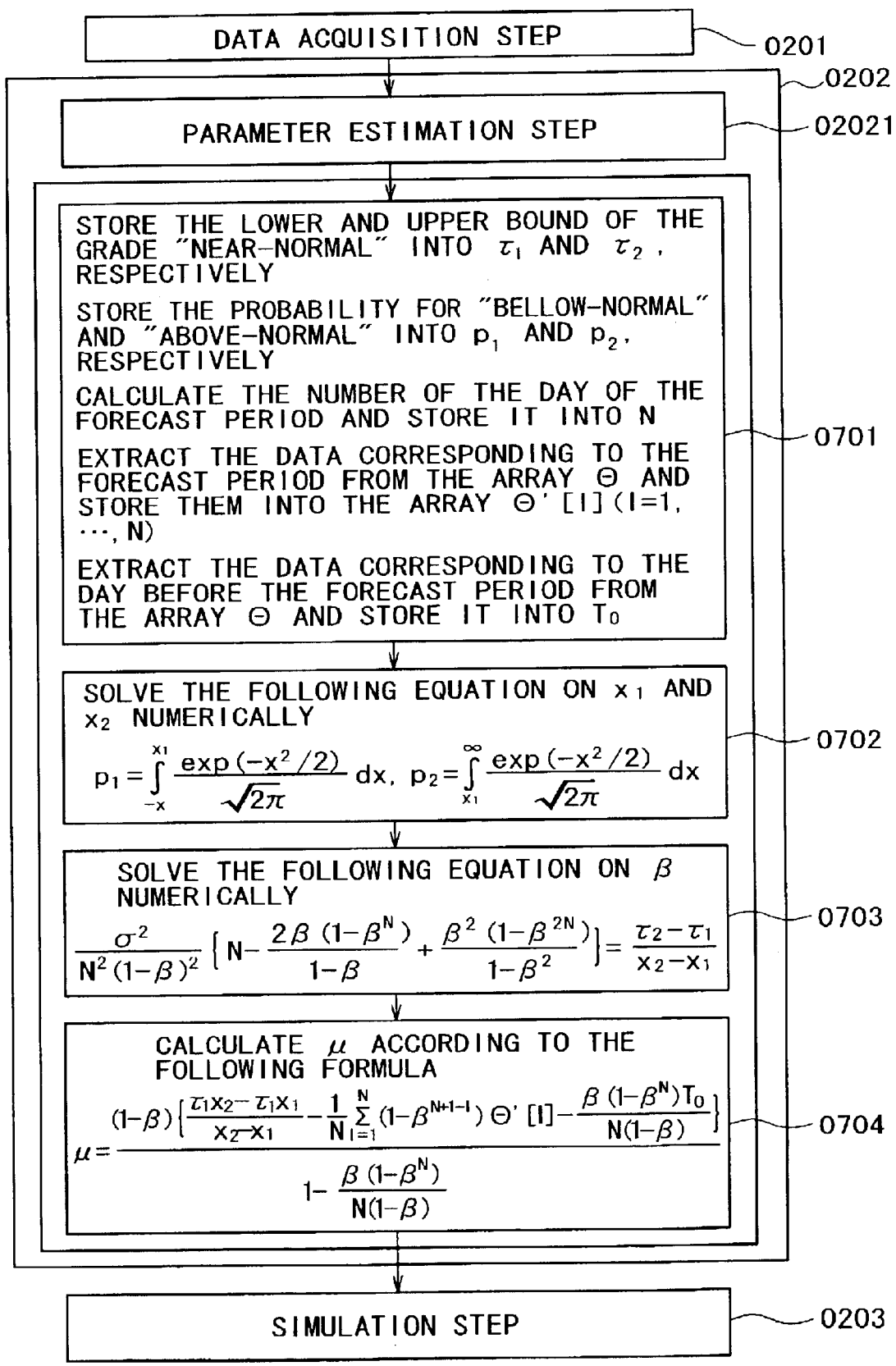
FIG. 7 is a flowchart illustrating an example of a parameter adjustment step of the meteorological time-series model of FIG. 2.

As illustrated in FIG. 7, the meteorological time-series model parameter adjustment step 02022 of FIG. 2 is composed of a long-range weather forecast data storage step 0701, an estimation condition storage step 0702, a x1–x2 calculation step 0703, a β-calculation step 0704 and a µ-calculation step 0705.

In the long-range weather forecast data storage step 0701, the data probabilities for "below-normal" and "above-normal" are respectively stored to $p_1$ and $p_2$ and the upper bound and lower bound of the range of "near-normal" are respectively stored to $T_1$ and $T_2$ from the long-range weather forecast data obtained in the data acquisition step of FIG. 2. Moreover, the number of days of forecast period is calculated and is then stored to N, an ordinary year temperature array Θ[l](l=1, . . . , N) of the forecast period is stored from the ordinary year array Θ[l](l=1, . . . , 365), and the temperature of the preceding day of the forecast period is stored as $T_0$ from the ordinary year temperature array Θ[l](l=1, . . . , 365). In the inverse function calculation step 0702 of the normal distribution, values of $x_1$ and $x_2$ are obtained from the [Expression 6]. In the β calculation step 0703, the value of β can be obtained from the [Expression 11]. However, the value obtained in the regression analysis step 0605 of FIG. 6 is used as σ2. Moreover, since the value of β can be obtained easily from the [Expression 11] using the Newton-Raphson's method, the detail method is not described here. In the µ calculation step 0704, the value of µ is obtained from the [Expression 18] derived from the [Expression 12] to obtain the value of µ. However, the value obtained in the β calculation step 0702 is used for β:

{Expression 18}

$$\mu = \frac{(1-\beta)\left\{\frac{\tau_1 x_2 - \tau_2 x_1}{x_2 - x_1} - \frac{1}{N}\sum_{l=1}^{N}(1-\beta^{N+1-l})\Theta'[l] - \frac{\beta(1-\beta^N)T_0}{N(1-\beta)}\right\}}{1 - \frac{\beta(1-\beta^N)}{N(1-\beta)}}$$

Next, an example of the meteorological quantities simulation step 0203 of this embodiment will be described with reference to FIG. 8. This meteorological quantities simulation step 0203 executes simulations based on the meteorological time-series model created in the meteorological time-series mode creation step 0202.

Figure 8:
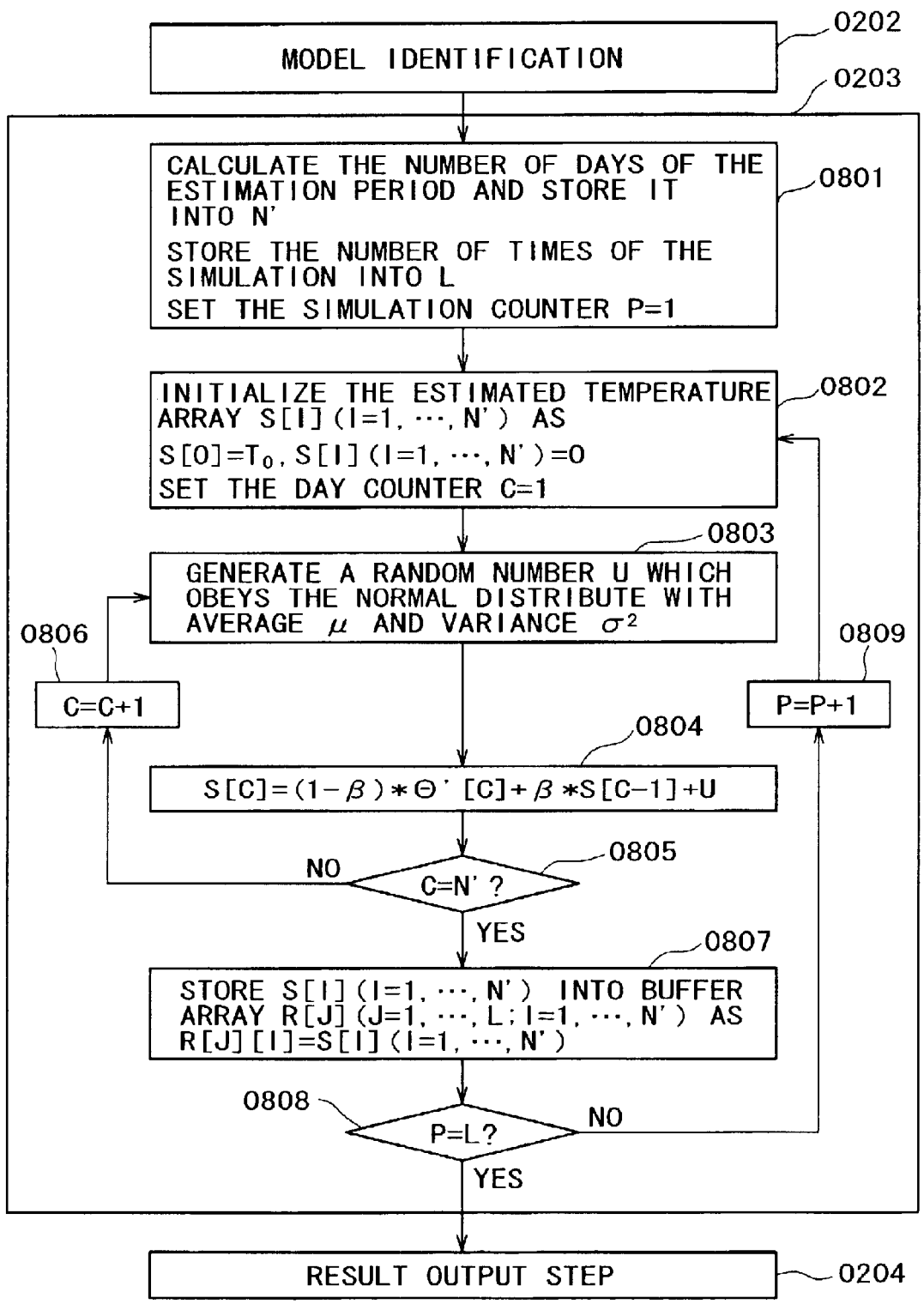
FIG. 8 is a flowchart illustrating an example of a meteorological quantities simulation step.

As illustrated in FIG. 8, the meteorological quantities simulation step 0203 of FIG. 2 is composed of an estimation condition storage step 0801, a simulation initialization step 0802, a random number generation step 0803, a temperature estimation step 0804, an estimation period end determination step 0805, an estimation days addition step 0806, an estimation temperature time-series accumulation step 0807, a simulation end determination step 0808, and a simulation number addition step 0809.

In the estimation condition storage step 0801, the number of days of estimation period is calculated and is then stored to N' and the number of times of simulation is stored to L to initialize the simulation number P to 1. In the simulation initialization step 0802, the estimation temperature time-series array S[l](l=1, . . . , N') is initialized to S[0]=$T_0$, S[l]=0 (l=1, . . . , N') in order to initialize the estimation day counter C to 1. In the random number generation step 0803, a random number U is generated depending on the normal distribution of average µ variation σ². However, the value acquired in the µ calculation step 0705 of FIG. 7 is used for µ and moreover the value obtained in the regression analysis step 0605 of FIG. 6 is used for σ². In the temperature estimation step 0804, temperature S[C] of the C-th day is estimated depending on the [Expression 19].

$S[C]=(1-\beta)\Theta'[C]+\beta S[C-1]+U$ [Expression 19]

In the estimation period end determination step 0805, whether the value of the estimation day counter C is equal to the number of days of estimation period N' or not is determined. When these are not equal, the process shifts to the estimation day addition step 0806 and when these are equal, the process shifts to the estimation temperature time-series accumulation step 0807, respectively. In the estimation day addition step 0806, the number of days of estimation C is counted up. In the estimation temperature time-series accumulation step 0807, the estimation temperature time-series sequence S[l](l=0, . . . , N') is copied to the two-dimensional array for data accumulation R[j][l] (j=1, . . . , L; l=1, . . . , N') to become R[P][l]=S[l](l=1, . . . , N').

In the simulation end determination step 0808, whether the simulation number P is equal to the number of times of simulation L or not is determined. When these are not equal, the process shifts to the simulation number addition step 0809 and when these are equal, the process comes to the end and the process then shifts to the meteorological quantities estimation result output step 0204, respectively.

Next, the meteorological quantities estimation result output step 0204 of FIG. 2 will be described with reference to FIG. 2 and FIG. 8. The meteorological quantities estimation result output step 0204 of FIG. 2 outputs the meteorological quantities estimation result 0214 of FIG. 2 based on the two-dimensional array R[J][l] (J=1, . . . , L; l=1, . . . ,N') of data accumulated in the estimation temperature time-series accumulation step 0807 of FIG. 8.

Next, an example of the meteorological quantities estimation result 0214 of FIG. 2 will be described with reference to FIG. 9. The meteorological quantities estimation result 0214 of this embodiment is composed of date 091, simulation number 092 and estimation temperature 093 of each date of each simulation number. In FIG. 9, for example, the estimation temperature of a day of the date July 1, of the simulation number is 25.3[° C.].

Next, an embodiment (first embodiment) of the meteorological quantities estimation system of the present invention will be described with reference to FIG. 11 to FIG. 14.

Figure 11:
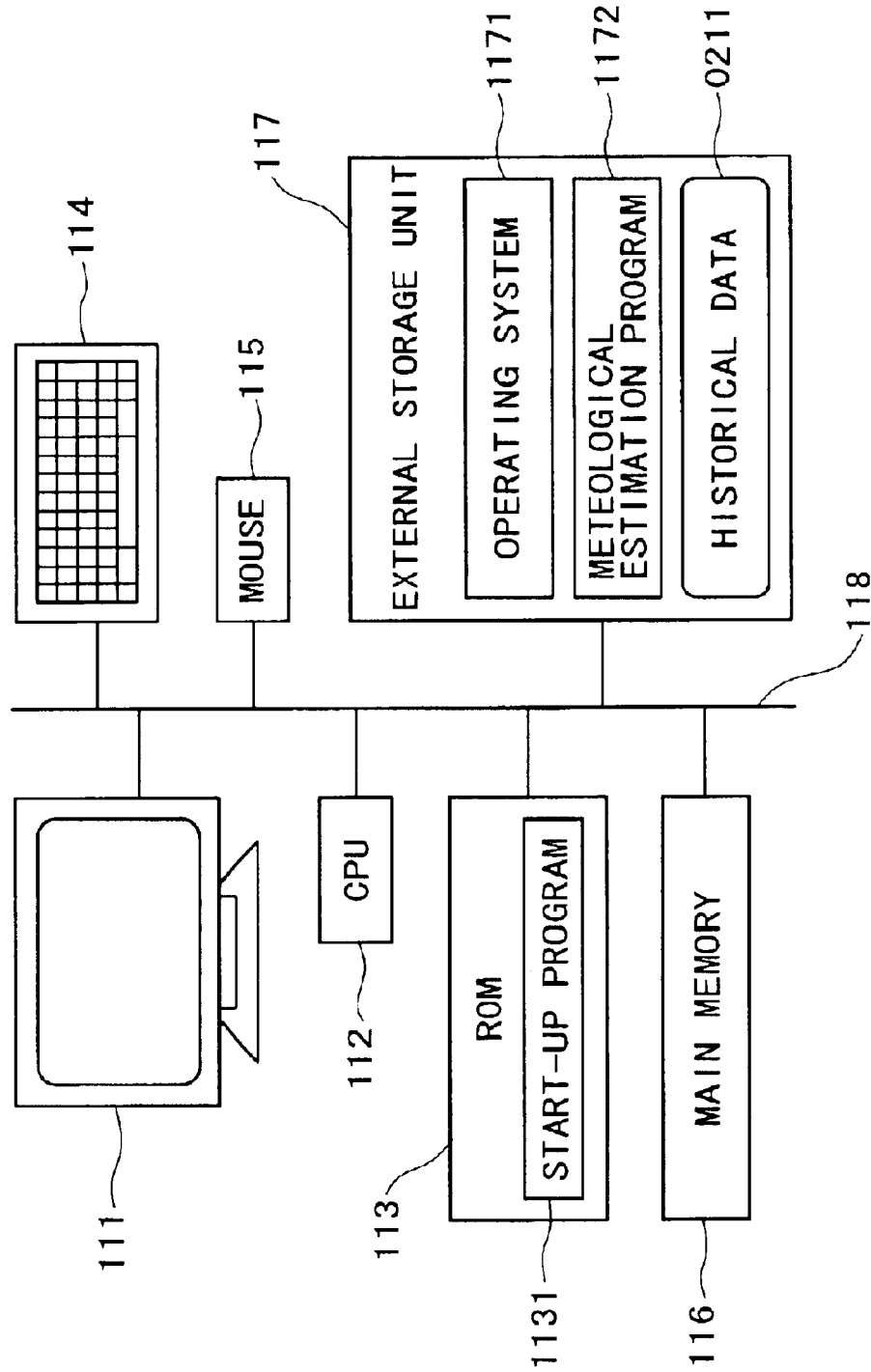
FIG. 11 is a block diagram illustrating a configuration example of a meteorological quantities estimation system as a first embodiment of the present invention.

The meteorological quantities estimation system of this embodiment is configured, as illustrated in FIG. 11, with a display 111, a CPU (Central Processing Unit) 112, a ROM (Read Only Memory) 113 storing a system activation program 1131, a keyboard 114, a mouse 115, a main memory 116, an operating system 1171, an external storage unit 117 storing a meteorological quantities estimation program 1172 and historical data of meteorological quantities 0211 which are connected with a communication bus 118.

Figure 12:
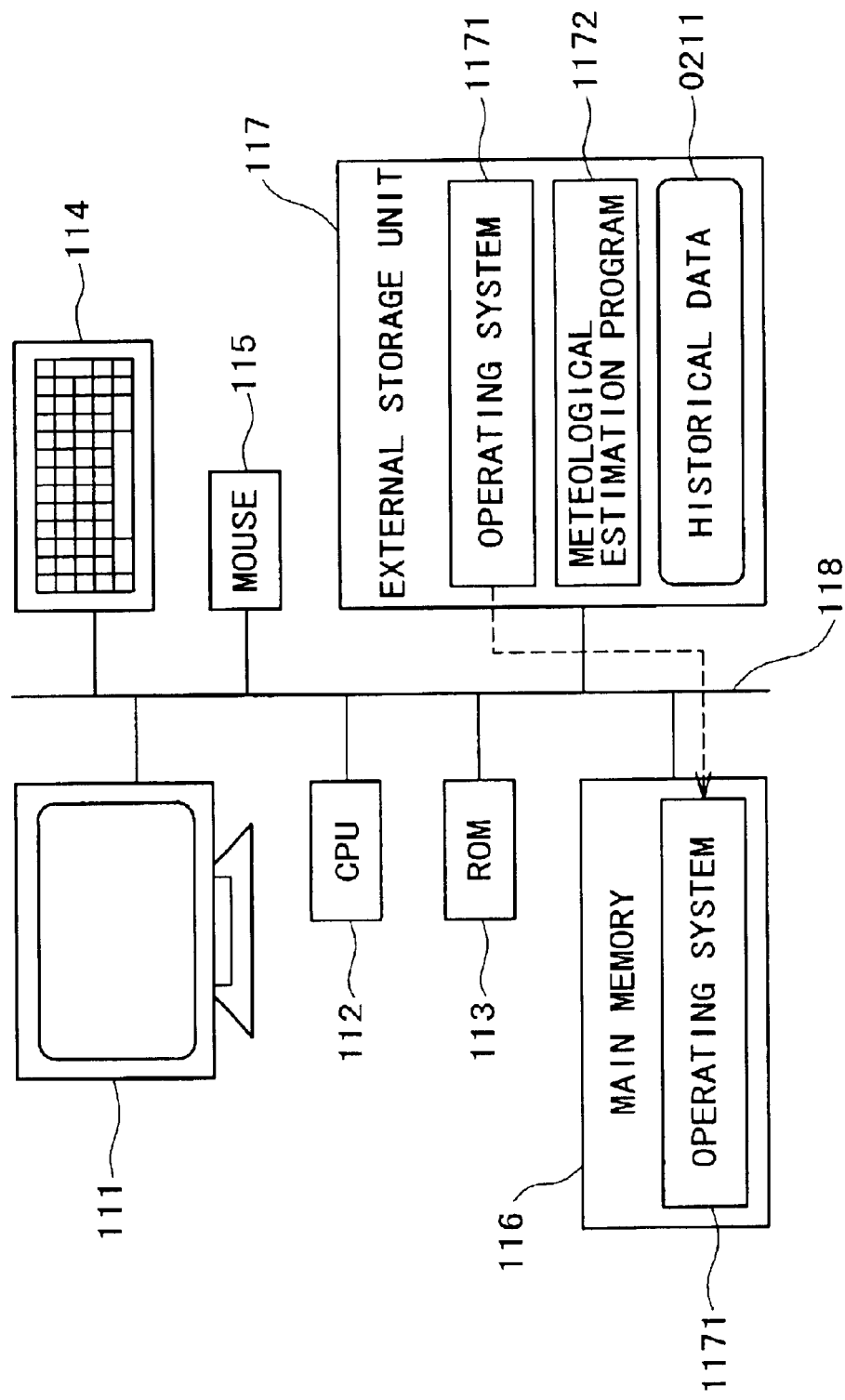
FIG. 12 is a block diagram illustrating an example of condition when hardware is activated in the meteorological quantities estimation system of FIG. 11.
Figure 13:
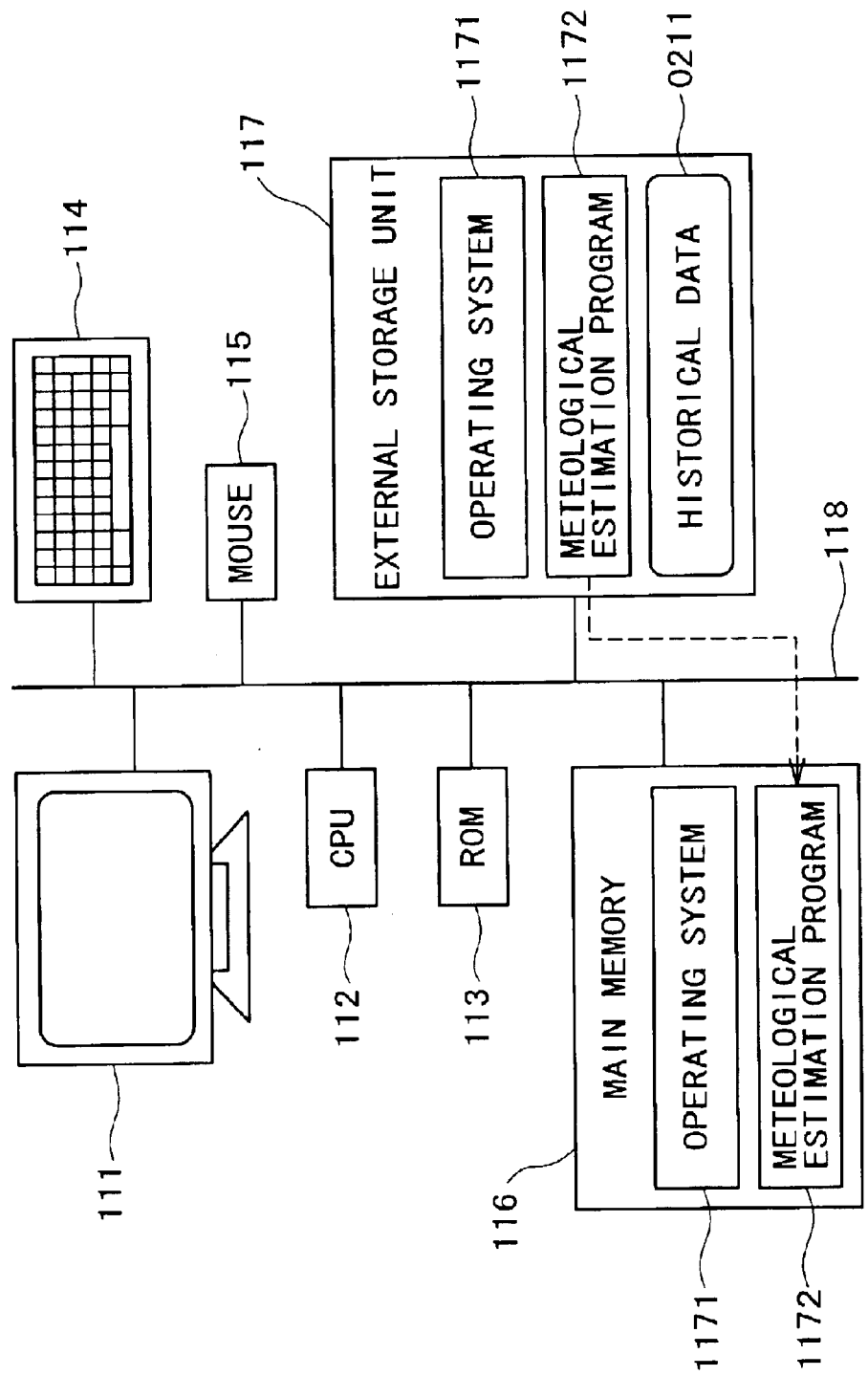
FIG. 13 is a block diagram illustrating an example of condition when an application is activated in the meteorological quantities estimation system of FIG. 11.
Figure 14:
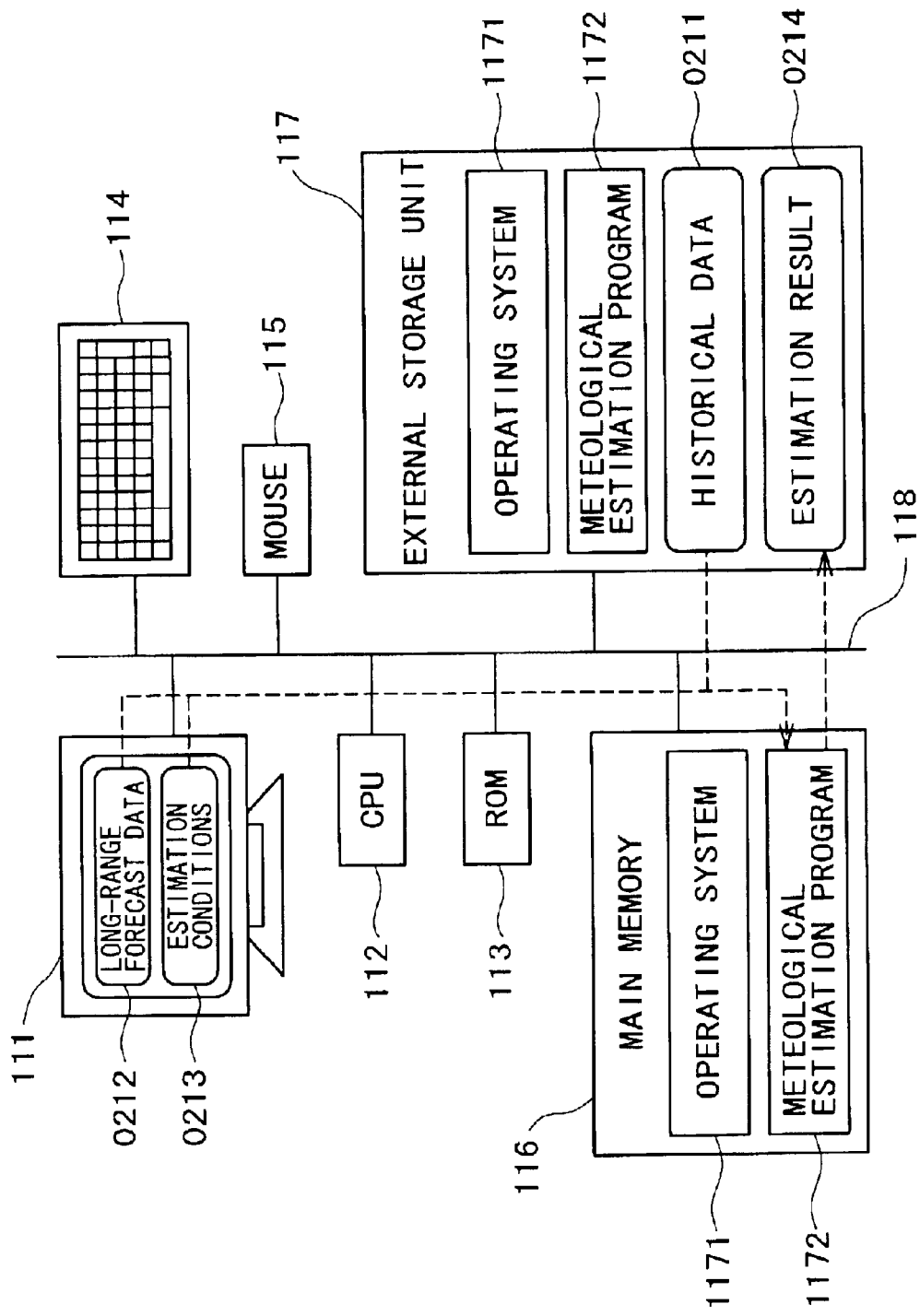
FIG. 14 is a block diagram illustrating an example of condition when the meteorological quantities estimation is executed in the meteorological quantities estimation system of FIG. 11.

First, when a hardware of the meteorological quantities estimation system is activated, the operating system 1171 is loaded to the main memory 116 as illustrated in FIG. 12. Moreover, when an application of the meteorological quantities estimation system is activated, the operating system 1171 and meteorological quantities estimation program 1172 are loaded to the main memory 116 as illustrated in FIG. 13. In addition, when estimation of meteorological quantities is executed, the meteorological quantities estimation program 1171 estimates, as illustrated in FIG. 14, the meteorological quantities by reading the historical data 0211 of meteorological quantities and the long-range weather forecast data 0212 and estimation condition 0213 inputted through the display 111, keyboard 114 and mouse 115 and then outputs the meteorological quantities estimation result 0214 to the external storage unit 117.

Figure 15:
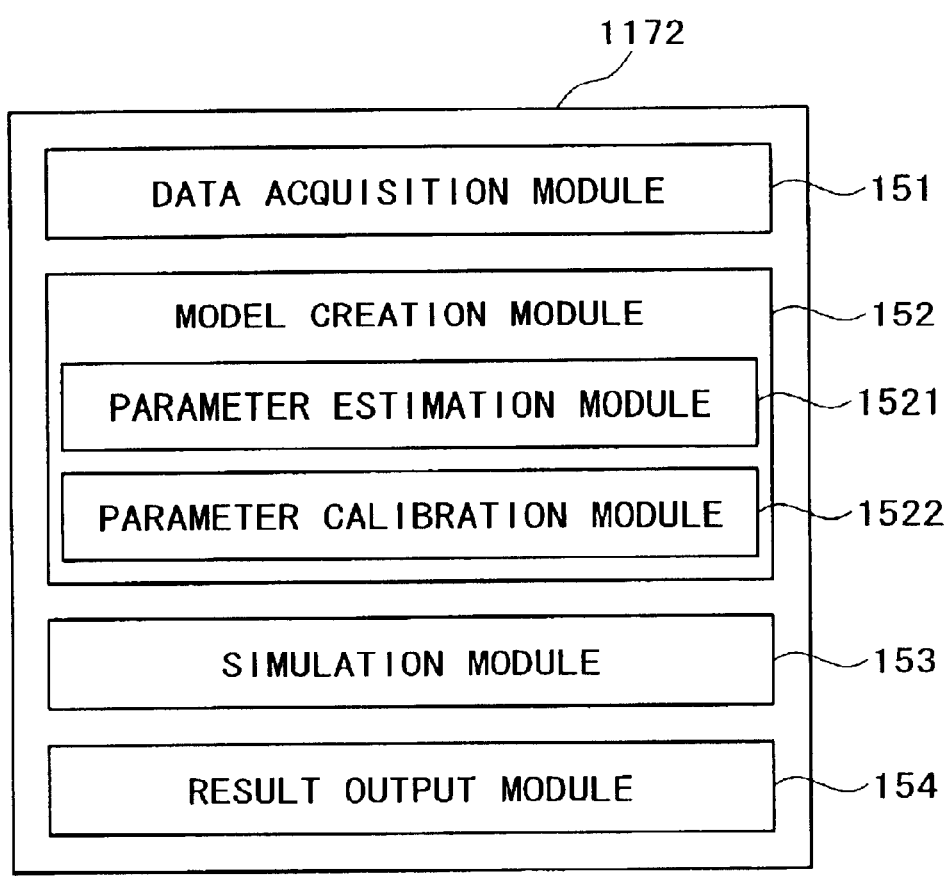
FIG. 15 is a block diagram illustrating an example of a meteorological quantities estimation program module in the meteorological quantities estimation system of FIG. 11.

Next, an example of the meteorological quantities estimation program 1172 of FIG. 11 to FIG. 14 will be described with reference to FIG. 15.

The meteorological quantities estimation program of this embodiment is composed of a data acquisition module 151, a meteorological time-series model creation module 152, a meteorological quantities simulation module 153 and a meteorological quantities estimation result output module 154. In addition, the meteorological time-series model creation module 152 is composed of a meteorological time-series model parameter estimation module 1521 and a meteorological time-series model parameter adjustment module 1522.

The data acquisition module 151, meteorological time-series model creation module 152, meteorological quantities simulation module 153, meteorological quantities estimation result output module 154, meteorological quantities model parameter estimation module 1521 and meteorological time-series model parameter adjustment module 1522 are respectively program modules to execute the processes conforming to the data acquisition step 0201, meteorological time-series model creation step 0202, meteorological quantities simulation step 0203, meteorological quantities estimation result output step 0204, meteorological time-series model parameter estimation step 02021 and the meteorological time-series model parameter adjustment step 02022 illustrated in FIG. 12.

An embodiment (second embodiment) of the meteorological quantities estimation system of the second embodiment will be described with reference to FIG. 16 to FIG. 19. The second embodiment is the embodiment for transmitting and receiving information via the communication network.

Figure 16:
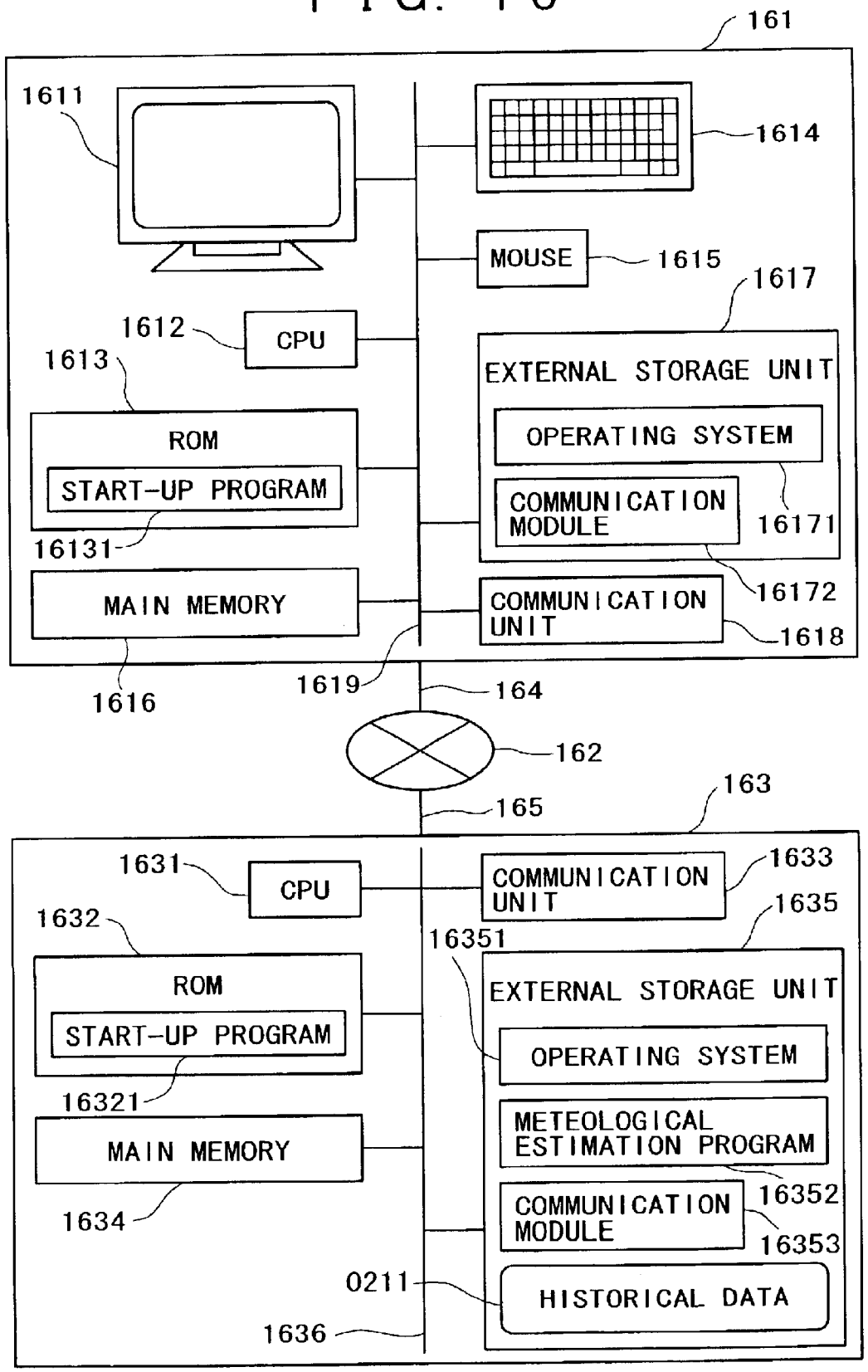
FIG. 16 is a block diagram illustrating a configuration example of the meteorological quantities estimation system as a second embodiment of the present invention.
Figure 17:
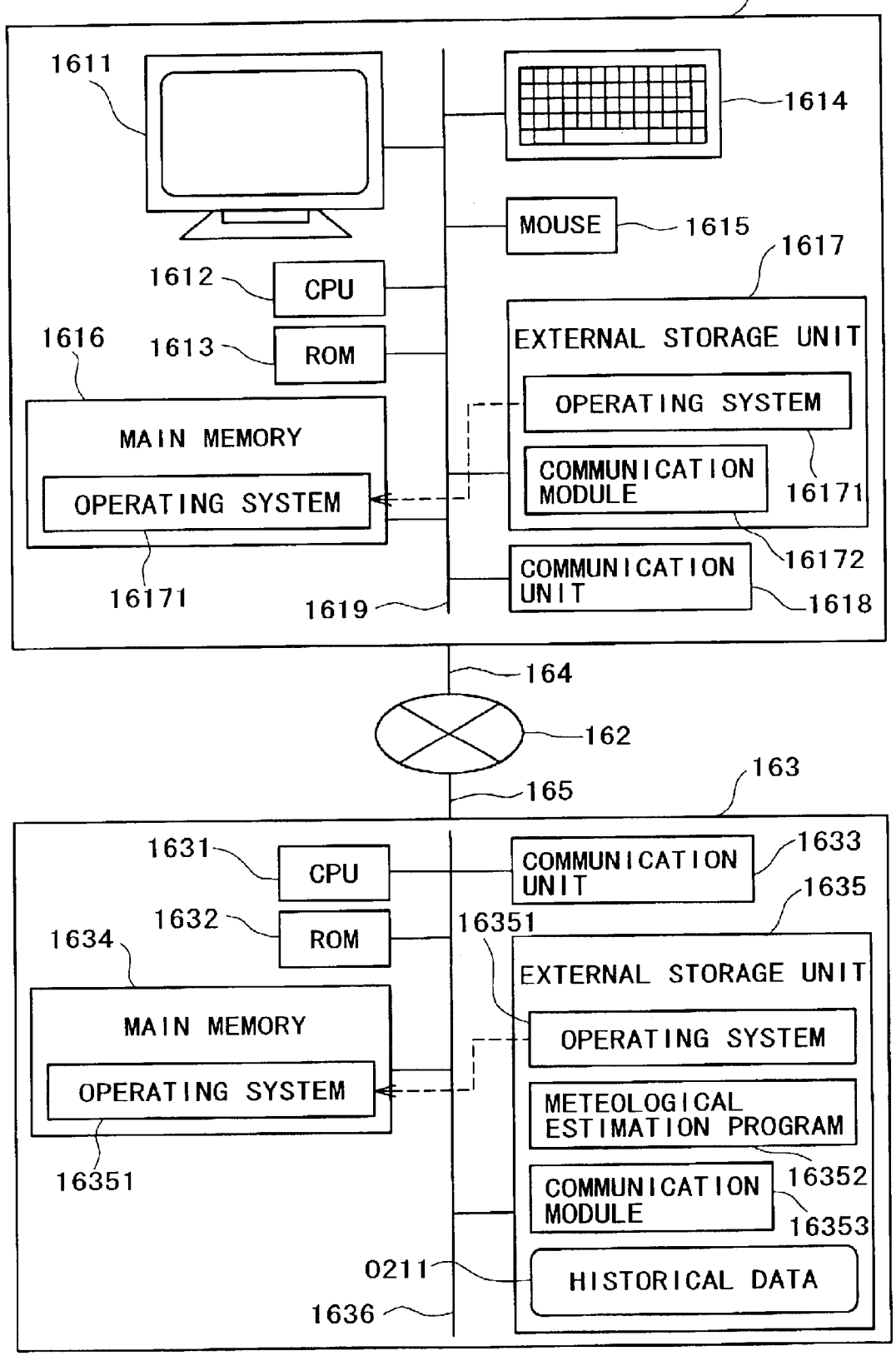
FIG. 17 is a block diagram illustrating an example of condition when the hardware is activated in the meteorological quantities estimation system of FIG. 16.

The meteorological quantities estimation system of the second embodiment comprises, as illustrated in FIG. 16, a client 161, a communication network 162, a server 163, a communication line 164 connecting the client 161 and communication network 162 and a communication line 165 connecting the server 163 and communication network 162. Moreover, the client 161 is configured with a display 1611, a CPU 1612, a ROM 1613 storing a system activation program 16131, a keyboard 1614, a mouse 1615, a main memory 1616, an operating system 16171, an external storage unit 1617 storing the communication module 16172 and a communication unit 1618 which are connected through a communication bus 1619. Here, the communication module 16172 is a program module for exchanging information of the communication network 162 with the client 161 via the communication unit 1618 and communication line 164. Moreover, the server 163 is configured with a CPU 1631, a ROM 1632 storing a system activation program 16321, a communication unit 1633, a main memory 1634, an operating system 16351, a meteorological quantities estimation program 16352, a communication module 16353 and an external storage unit 1635 storing the historical data of meteorological quantities 0211 which are connected via a communication bus 1636. Here, the communication module 16353 is the program module for exchanging information of communication network 162 with the server 163 via the communication unit 1633 and communication line 165.

Figure 18:
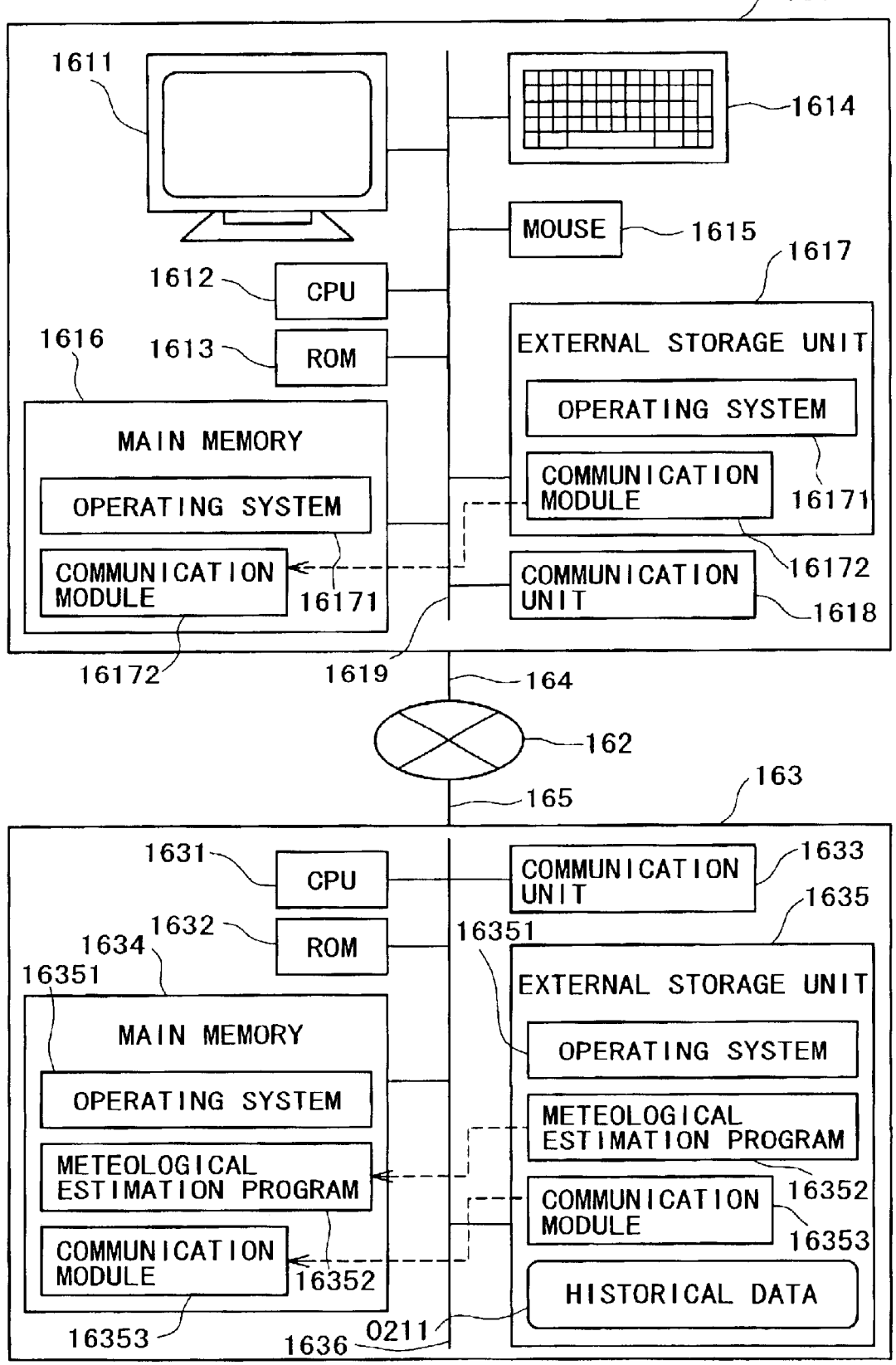
FIG. 18 is a block diagram illustrating an example of condition when an application is activated in the meteorological quantities estimation system of FIG. 16.

When the client and hardware of server of the meteorological quantities estimation system are activated, the operating system 16171 is loaded to the main memory 1616 on the side of client 161, while the operating system 16351 is loaded to the main memory 1634 on the side of server 163. Moreover, when applications of client and server in the meteorological quantities estimation system are activated, the communication module 16172 is loaded to the main memory 1616 on the side of client 161 as illustrated in FIG. 18, while the meteorological quantities estimation program 16352 and communication module 16353 are also loaded to the main memory 1634 on the side of server 163.

Figure 19:
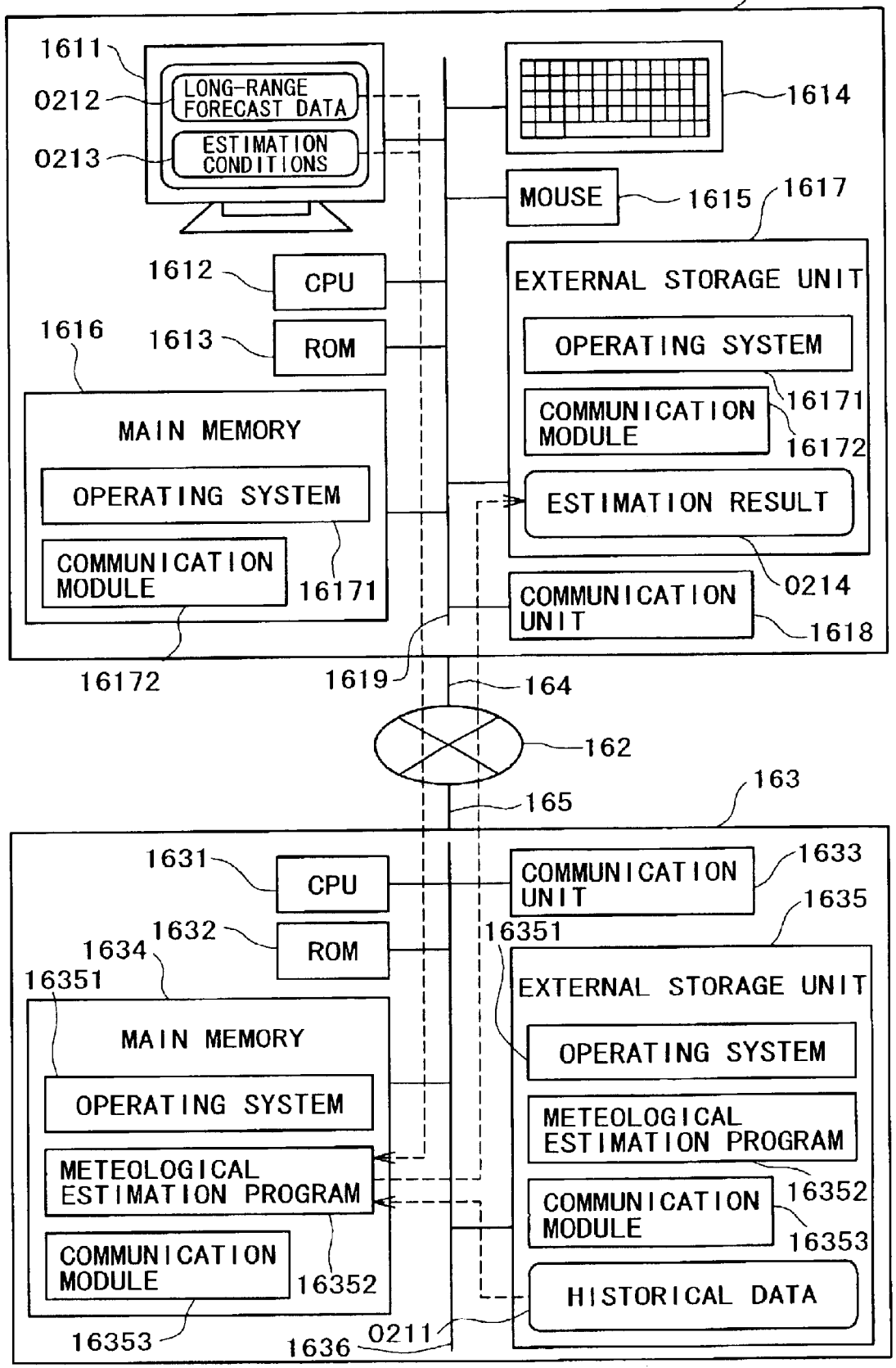
FIG. 19 is a block diagram illustrating an example of condition when the meteorological quantities estimation is executed in the meteorological quantities estimation system of FIG. 16.

Moreover, when the meteorological quantities are estimated, as in FIG. 19, the meteorological quantities estimation program 16352 executes estimation of meteorological quantities by reading the historical data of meteorological quantities 0211 and the long-range weather forecast data 0212 and estimation condition 0213 inputted via the display 1611, keyboard 1614 and mouse 1615 of the client and then outputs the meteorological quantities estimation result 0214 to the external storage unit 1617 of the client. The meteorological quantities estimation program 16352 is configured in the same format as that of FIG. 15.

Next, an example of the input display image of the long-range weather forecast data in the meteorological quantities estimation system of the first and second embodiments of the present invention will be described with reference to FIG. 20.

The input display image of long-range weather forecast data as an example is composed of a long-range weather forecast data input pull-down menu 201 and a probability distribution input pull-down menu 202. A result of input of this input display image is then inputted to the meteorological quantities estimation program as the long-range weather forecast data 0212. The information to be displayed in the input display image of the long-range weather forecast data is never limited to this information. For example, in the second embodiment, the data for input display image is transmitted from the sever 163 and formed as the input display image by a browser program (not illustrated) of the client 161.

Next, an example of the input display image of the estimation condition of the meteorological quantities estimation system in the first and second embodiments of the present invention will be described with reference to FIG. 21.

An input display image of the estimation condition indicated as an example is composed of a estimation period input pull-down menu 211, an estimation point input 212 and a simulation number input pull-down menu 213. The result inputted through this input display image is then inputted to the meteorological quantities estimation program as the estimation condition 0213. The information for displaying the estimation condition to the input display image is not limited to such information. For instance, the data for displaying the input display image is transmitted, for example, from the server 163 and is formed as an input display image with a browser program (not illustrated) of the client 161.

The present invention described above is never limited to the embodiments described above and allows various changes and modifications.

Namely, the Dischel model described above is only an example and the long-range weather forecast data can also be fetched for models in the same manner even when various meteorological time-series models are used. Moreover, for example, the long-term forecast data for one month can provide probability distribution of average temperature during the period and amount of accumulated rainfall during the period for every first week, second week and third to fourth weeks of the coming month, in addition to the probability distribution of average temperature during the period and amount of accumulated rainfall during the period for one month in future, but the present invention can easily expand the embodiments thereof to fetch the information described above. For example, it is enough when the parameter adjustment process is executed for every first, second, third and fourth weeks and the parameters corresponding to each section for the simulation are used.

Moreover, the second embodiment, for example, can also provide, via the communication network, the charged services to the client where the client is charged and also the charged services where the client is not charged.

According to the present invention, since the meteorological quantities such as temperature and amount of rainfall of each day in future can be estimated not only by the historical data in the past but also by reflection of the long-range weather forecast data, the influence on the economic activities can be evaluated more accurately.

System And Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/ specialized computer or microprocessor are software modules for implementing the teachings of the present invention, including, but not limited to, acquiring estimation conditions for meteorological quantities including historical data of meteorological quantities such as temperature and amount of rainfall observed in the past, acquiring an estimation period for estimating meteorological quantities at an estimation point, acquiring a number of times for a simulation, acquiring long-range weather forecast data provided by the Meteorological Agency for the meteorological quantities during the estimation period at the estimation point, creating a meteorological time-series model for the meteorological quantities during the estimation period at the estimation point based on acquired historical data of meteorological quantities and acquired long-range weather forecast data, conducting for the number of times the simulation using the meteorological time-series model, and outputting a meteorological quantities estimation result based on the simulation using the meteorological time-series model, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for estimating meteorological quantities, the method comprising:

acquiring estimation conditions for meteorological quantities including historical data of meteorological quantities such as temperature and amount of rainfall observed in the past;

acquiring an estimation period for estimating meteorological quantities at an estimation point;

acquiring a number of times for a simulation;

acquiring long-range weather forecast data provided by the Meteorological Agency for the meteorological quantities during the estimation period at the estimation point;

creating a meteorological time-series model for the meteorological quantities during the estimation period at the estimation point based on acquired historical data of meteorological quantities and acquired long-range weather forecast data;

conducting for the number of times the simulation using the meteorological time-series model; and outputting a meteorological quantities estimation result based on the simulation using the meteorological time-series model.

2. The method of claim 1, wherein the step of creating the meteorological time-series model comprises:

estimating parameters of the meteorological time-series model based on the acquired historical data to obtain estimated parameters; and adjusting the estimated parameters based on the acquired long-range weather forecast data.

3. The method of claim 2, wherein the acquired long-range weather forecast data includes a forecast period covering the estimation period, a range of grade "near-normal" for the average temperature during the forecast period, and a probability distribution of three grades "below-normal" and "near-normal" and "above-normal", wherein the step of adjusting estimated parameters comprises adjusting estimated model parameters which characterize a probability distribution of average temperature during the forecast period based on the acquired forecast data.

4. The method of claim 2, wherein the acquired long-range weather forecast data includes a forecast period covering the estimation period, a range of grade "near-normal" for an accumulated amount of rainfall during the forecast period, and a probability distribution of three grades "below-normal" and "near-normal" and "above-normal", wherein the step of adjusting estimated parameters comprises adjusting parameters which characterize a probability distribution of accumulated rainfall during the forecast period based the acquired forecast data.

5. A system for estimating meteorological quantities, the system comprising:

an acquiring device configured to acquire, estimation conditions for meteorological quantities including historical data of meteorological quantities such as temperature and amount of rainfall observed in the past, an estimation period for estimating meteorological quantities at an estimation point, a number of times for a simulation, and long-range weather forecast data provided by the Meteorological Agency for the meteorological quantities during the estimation period at the estimation point;

a creating device configured to create a meteorological time-series model for the meteorological quantities during the estimation period at the estimation point based on acquired historical data of meteorological quantities and acquired long-range weather forecast data;

a simulation device configured to conduct for the number of times the simulation using the meteorological time-series model; and an outputting device configured to output a meteorological quantities estimation result based on the simulation using the meteorological time-series model.

6. The system of claim 5, wherein the creating device is further configured to:

estimate parameters of the meteorological time-series model based on the acquired historical data to obtain estimated parameters, and adjust the estimated parameters based on the acquired long-range weather forecast data.

7. The system of claim 6, wherein the acquired long-range weather forecast data includes a forecast period covering the estimation period, a range of grade "near-normal" for the average temperature during the forecast period, and a probability distribution of three grades "below-normal" and "near-normal" and "above-normal", wherein the creating device is further configured to adjust estimated model parameters which characterize a probability distribution of average temperature during the forecast period based on the acquired forecast data.

8. The system of claim 6, wherein the acquired long-range weather forecast data includes a forecast period covering the estimation period, a range of grade "near-normal" for the average temperature during the forecast period, and a probability distribution of three grades "below-normal" and "near-normal" and "above-normal", wherein the creating device is further configured to adjust parameters which characterize a probability distribution of accumulated rainfall during the forecast period based the acquired forecast data.

9. The system of claim 6, further comprising a communication device configured to send and receive information via a network, wherein the acquiring device is further configured to acquire the long-range weather forecast data and the estimation conditions via the network, wherein the outputting device is further configured to output the meteorological quantities estimation result via the network.

10. The system of claim 5, wherein devices of the system are software modules of a program, wherein the software modules include instructions executable by one or more processors of a computer.

11. The system of claim 6, wherein devices of the system are software modules of a program, wherein the software modules include instructions executable by one or more processors of a computer.

12. The system of claim 7, wherein devices of the system are software modules of a program, wherein the software modules include instructions executable by one or more processors of a computer.

13. The system of claim 8, wherein devices of the system are software modules of a program, wherein the software modules include instructions executable by one or more processors of a computer.

14. The system of claim 9, wherein devices of the system are software modules of a program, wherein the software modules include instructions executable by one or more processors of a computer.

15. A computer-readable medium carrying one or more sequences of one or more instructions for estimating meteorological quantities, the one or more sequences of one or more instructions including instructions which, when executed by one or more processors, cause the one or more processors to perform the steps of:

acquiring estimation conditions for meteorological quantities including historical data of meteorological quantities such as temperature and amount of rainfall observed in the past;

acquiring an estimation period for estimating meteorological quantities at an estimation point;

acquiring a number of times for a simulation;

acquiring long-range weather forecast data provided by the Meteorological Agency for the meteorological quantities during the estimation period at the estimation point;

creating a meteorological time-series model for the meteorological quantities during the estimation period at the estimation point based on acquired historical data of meteorological quantities and acquired long-range weather forecast data;

conducting for the number of times the simulation using the meteorological time-series model; and outputting a meteorological quantities estimation result based on the simulation using the meteorological time-series model.

16. The computer-readable medium of claim 15, wherein the step of creating the meteorological time-series model further causes the one or processors to:

estimating parameters of the meteorological time-series model based on the acquired historical data to obtain estimated parameters; and adjusting the estimated parameters based on the acquired long-range weather forecast data.

17. The computer-readable medium of claim 16, wherein the acquired long-range weather forecast data includes a forecast period covering the estimation period, a range of grade "near-normal" for the average temperature during the forecast period, and a probability distribution of three grades "below-normal" and "near-normal" and "above-normal", wherein the step of adjusting estimated parameters further causes the one or processors to carry out the step of adjusting estimated model parameters which characterize a probability distribution of average temperature during the forecast period based on the acquired forecast data.

18. The computer-readable medium of claim 16, wherein the acquired long-range weather forecast data includes a forecast period covering the estimation period, a range of grade "near-normal" for the average temperature during the forecast period, and a probability distribution of three grades "below-normal" and "near-normal" and "above-normal", wherein the step of adjusting estimated parameters further causes the one or more processors to carry out the step of adjusting parameters which characterize a probability distribution of accumulated rainfall during the forecast period based the acquired forecast data.

* * * * *